(12) United States Patent
Michaelis et al.

(10) Patent No.: US 10,165,116 B2
(45) Date of Patent: Dec. 25, 2018

(54) METHOD FOR INCLUDING CALLER-PROVIDED SUBJECT INFORMATION IN THE CALLER-ID DISPLAY OF ENTERPRISE TELEPHONES

(71) Applicant: AVAYA INC., Santa Clara, CA (US)

(72) Inventors: Paul Roller Michaelis, Louisville, CO (US); Charles C. Wrobel, Newcastle, WA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/715,176

(22) Filed: May 18, 2015

(65) Prior Publication Data
US 2015/0249744 A1  Sep. 3, 2015

Related U.S. Application Data

(62) Division of application No. 12/473,852, filed on May 28, 2009, now abandoned.

(51) Int. Cl.
*H04M 3/436* (2006.01)
*H04M 3/42* (2006.01)
*H04M 3/51* (2006.01)

(52) U.S. Cl.
CPC ..... *H04M 3/4365* (2013.01); *H04M 3/42042* (2013.01); *H04M 3/42059* (2013.01); *H04M 3/5191* (2013.01); *H04M 2203/2038* (2013.01)

(58) Field of Classification Search
CPC .......... H04M 3/4365; H04M 3/42042; H04M 3/42059; H04M 3/5191; H04M 2203/2038
See application file for complete search history.

(56) References Cited

U.S. PATENT DOCUMENTS

| | | | |
|---|---|---|---|
| 5,537,470 A | 7/1996 | Lee | |
| 6,240,168 B1 * | 5/2001 | Stanford | H04M 1/2473 379/110.01 |

(Continued)

OTHER PUBLICATIONS

"Cisco Unity VMO Message Default Subject Line Appearance," Cisco Systems, Inc., last updated Aug. 17, 2007, 2 pages [retrieved from: http://www.cisco.com/en/US/products/sw/voicesw/ps2237/products_tech_note09186a00801a31ca.shtml].

(Continued)

*Primary Examiner* — Lisa Hashem
(74) *Attorney, Agent, or Firm* — Sheridan Ross P.C.

(57) ABSTRACT

Say John on a PSTN needs to contact Chuck. Chuck's telephone is a SIP, H.323, DCP, or analog endpoint, connected to the PSTN via an enterprise network and gateway. John already knows Chuck's number. Before dialing Chuck's phone number, John navigates to a URL that includes something unique to Chuck in its name, such as www.xyzco.com/303-555-212 or www.xyzco.com/chuck. The webpage of the URL contains two fields: number you will be calling from and subject. John enters his number and then enters the subject "Sale going through!" John then dials Chuck's number. The enterprise network receives the call and the associated Caller-ID via its PSTN gateway, maps the inbound Caller-ID to the information provided by John, routes the call to Chuck's phone, and causes the display on Chuck's phone to show John's Caller-ID and the subject of the call. Chuck thinks the subject may be important and therefore decides to answer.

20 Claims, 4 Drawing Sheets

(56) References Cited

U.S. PATENT DOCUMENTS

| | | | |
|---|---|---|---|
| 6,314,089 B1 * | 11/2001 | Szlam | H04M 3/2218 370/270 |
| 6,320,943 B1 * | 11/2001 | Borland | H04M 1/274583 379/112.01 |
| 6,385,646 B1 | 5/2002 | Brown et al. | |
| 6,404,858 B1 * | 6/2002 | Farris | H04Q 3/0045 379/201.02 |
| 6,456,841 B1 | 9/2002 | Tomimori | |
| 6,487,277 B2 | 11/2002 | Beyda et al. | |
| 6,717,936 B1 * | 4/2004 | Srinivasan | H04L 12/5692 370/352 |
| 6,724,872 B1 | 4/2004 | Moore et al. | |
| 6,738,462 B1 * | 5/2004 | Brunson | H04L 51/36 379/142.04 |
| 6,747,970 B1 * | 6/2004 | Lamb | H04L 12/6418 370/352 |
| 6,829,243 B1 * | 12/2004 | Sundhar | H04M 7/006 370/401 |
| 7,123,700 B1 * | 10/2006 | Weaver, III | H04L 29/06027 379/88.19 |
| 7,274,781 B2 | 9/2007 | Lipton et al. | |
| 7,280,849 B1 * | 10/2007 | Bailey | H04M 1/271 455/556.1 |
| 7,313,227 B2 | 12/2007 | Jones | |
| 7,336,772 B1 * | 2/2008 | Velusamy | H04M 3/4935 379/142.06 |
| 7,440,748 B2 | 10/2008 | Matsumoto et al. | |
| 8,213,966 B1 * | 7/2012 | Typrin | H04L 51/066 455/414.1 |
| 8,467,508 B2 | 6/2013 | Ying et al. | |
| 8,577,000 B1 * | 11/2013 | Brown | H04W 4/16 379/114.13 |
| 8,594,318 B2 | 11/2013 | Liang et al. | |
| 8,762,153 B2 * | 6/2014 | Lewis | G10L 15/08 704/231 |
| 2001/0036252 A1 | 11/2001 | Renner et al. | |
| 2002/0196914 A1 | 12/2002 | Ruckart | |
| 2003/0041030 A1 * | 2/2003 | Mansfield | H04M 1/274516 705/50 |
| 2003/0068020 A1 | 4/2003 | Hamrick et al. | |
| 2004/0190495 A1 * | 9/2004 | White | H04L 29/06027 370/352 |
| 2005/0190744 A1 | 9/2005 | Sun et al. | |
| 2005/0272473 A1 | 12/2005 | Sheena et al. | |
| 2006/0072719 A1 | 4/2006 | Ruckart | |
| 2006/0177030 A1 * | 8/2006 | Rajagopalan | H04M 3/42263 379/142.07 |
| 2006/0253593 A1 * | 11/2006 | Jachner | H04M 3/42195 709/227 |
| 2007/0011337 A1 | 1/2007 | Brown et al. | |
| 2007/0036284 A1 * | 2/2007 | Raghav | H04M 1/575 379/67.1 |
| 2007/0036288 A1 * | 2/2007 | Parikh | H04Q 3/0016 379/88.02 |
| 2007/0047726 A1 | 3/2007 | Jabbour et al. | |
| 2007/0054704 A1 | 3/2007 | Satoh | |
| 2007/0058790 A1 * | 3/2007 | Wynn | H04L 29/12264 379/88.17 |
| 2007/0242809 A1 | 10/2007 | Mousseau et al. | |
| 2007/0280445 A1 * | 12/2007 | Shkedi | H04L 12/66 379/93.23 |
| 2007/0286399 A1 * | 12/2007 | Ramamoorthy | H04M 1/274516 379/355.02 |
| 2008/0037720 A1 * | 2/2008 | Thomson | H04M 3/4931 379/88.01 |
| 2008/0240411 A1 | 10/2008 | Dasgupta | |
| 2009/0047934 A1 * | 2/2009 | Wassingbo | H04M 3/42042 455/412.2 |
| 2009/0086939 A1 * | 4/2009 | Chatterjee | H04M 3/42059 379/93.03 |
| 2010/0303219 A1 | 12/2010 | Michaelis et al. | |
| 2012/0057684 A1 | 3/2012 | Brahm et al. | |
| 2014/0057608 A1 * | 2/2014 | Hillier | H04M 1/274516 455/414.1 |
| 2014/0198907 A1 * | 7/2014 | Hodges | H04M 3/44 379/216.01 |
| 2014/0211930 A1 * | 7/2014 | Hodges | H04M 1/274558 379/216.01 |
| 2014/0310003 A1 * | 10/2014 | Lewis | G10L 15/22 704/270.1 |
| 2016/0044163 A1 * | 2/2016 | Jiang | H04M 3/42042 379/142.06 |
| 2016/0173693 A1 * | 6/2016 | Spievak | G06Q 30/0202 379/265.09 |
| 2016/0191708 A1 * | 6/2016 | Bailey | H04M 3/42093 455/414.1 |
| 2018/0048759 A1 * | 2/2018 | Sharpe | H04M 3/436 |

OTHER PUBLICATIONS

Official Action for U.S. Appl. No. 12/473,852, dated Nov. 2, 2011 10 pages.
Official Action for U.S. Appl. No. 12/473,852, dated Apr. 9, 2012 13 pages.
Official Action for U.S. Appl. No. 12/473,852, dated Dec. 9, 2014 17 pages.
Official Action for U.S. Appl. No. 12/473,852, dated Mar. 6, 2015 5 pages Restriction Requirement.
Official Action for U.S. Appl. No. 12/473,852, dated Nov. 12, 2015 10 pages.

\* cited by examiner

METHOD FOR INCLUDING CALLER-PROVIDED SUBJECT INFORMATION IN THE CALLER-ID DISPLAY OF ENTERPRISE TELEPHONES

PRIORITY CLAIM

This patent application is a divisional application of U.S. patent application Ser. No. 12/473,852, filed May 28, 2009 which is incorporated herein by reference in its entirety.

FIELD OF THE INVENTION

One exemplary aspect of the present invention is directed toward communications, and more specifically toward providing information associated with a call. Even more particularly, one exemplary aspect is directed toward providing caller-provided subject information in a Caller-ID display of a callee.

BACKGROUND OF THE INVENTION

Caller-ID, also known as Caller-Identification (CID) or alternatively Calling Number Identification (CNID) is a public telephone service provided over the plain old telephone service (POTS) lines that transmits a caller's number to the called party's telephone equipment during the ringing signal, or when the call is being setup before the call is answered. Caller-ID can optionally provide a name, either personal or company, with the calling telephone number, with the Caller-ID information optionally being shown on the display on the called party's telephone.

SUMMARY OF THE INVENTION

Called parties may want to know the purpose of an incoming call, and not just who is calling, in order to decide whether to answer the call or, for example, let the call go to voicemail or be unanswered. Solutions such as the Avaya one-X Speech™ allows a calling party to record a subject by voice, for playback to the called party before the called party accepts the call. However, this solution requires the called party to go off-hook in order to hear the subject.

Some voicemail systems allow messages to be tagged with a textual subject line. However, the only way this has become feasible with call-answer messages has been through speech-to-text conversion.

When calling into a contact center, a calling party may want to speak with a specific agent. Keeping in mind that the agent's name is probably now known by the caller, the IVR, or automated attendant-based approach of "use your dial pad to enter the name of the party you seek" is not feasible. While some solutions allow callers to request a specific skill set, such as a fire insurance specialist, those solutions do not permit a specific individual to be requested, such as "the customer service representative who helped me on December 1."

FCC rules prohibit using the PSTN to send anything other than Caller-ID to the called party prior to the call party going off-hook. Keeping in mind that toll charges do not start until the called party answers, the purpose of this rule is to prevent people from being able to use the PSTN to send information for free. Therefore, any solution that permits calling parties to include a "subject" or "topic" is part of the pre-answer information must not utilize the PSTN to transmit this information.

One exemplary aspect of this invention is interesting in the manner in which it solves the dilemma of the FCC rules prohibiting using the PSTN to send anything other than Caller-ID to the called party prior to the called party going off-hook. In accordance with an exemplary embodiment, the calling party uses an Internet-based mechanism to provide the subject to be displayed to the called party.

For example, John on the PSTN needs to contact Chuck. Chuck's telephone is a SIP, H.323, DCP (Digital Communication Protocol), soft phone, digital endpoint, or analog endpoint, connected to the PSTN via an enterprise network and gateway. John already knows Chuck's number. Before dialing Chuck's phone number, John navigates to a URL that, in an exemplary embodiment, includes something unique to Chuck in its name, such as www.xyzcompany.com/303-555-1212 or www.xyzcompany.com/chuck. The webpage of the URL contains two fields: number you will be calling from and subject. John enters his phone number and then enters the subject "the buffet was a bad idea." John then dials Chuck's number. The enterprise network receives the call and the associated Caller-ID via its PSTN gateway, maps the inbound Caller-ID to the information provided by John via the Internet, routes the call to Chuck's phone, and causes the display on Chuck's phone to show John's Caller-ID and the subject of the call. Chuck thinks the subject may be important and therefore decides to answer.

In another exemplary embodiment, Bill on the PSTN needs to contact Paul. Paul's telephone is a SIP, H.323, DCP, digital endpoint, soft phone, or analog endpoint, connected to the PSTN via an enterprise network and gateway. Bill does not know Paul's number. Bill navigates to a corporate URL that contains three fields: Person you are trying to reach, number you will be calling from, and subject. Bill enters Paul's name, the number he is calling from, and the subject "I need the money you owe me." Bill then dials the number for the corporate switchboard. The enterprise network receives the call and the associated Caller-ID via its PSTN gateway, maps the inbound Caller-ID to the information provided by Bill via the Internet, does a database look-up to find Paul's phone number, and then causes the display on Paul's phone to show Bill's Caller-ID and the subject of the call. Paul sees the Caller-ID and subject (i.e., "I need the money you owe me.") and decides not to answer the phone. Bill's call is routed to Paul's voicemail mailbox. An optional embodiment includes the ability for the message that Bill leaves to be tagged automatically with the subject of the call as entered by Bill.

In another exemplary embodiment, a customer had been helped previously by a female, Japanese-speaking contact center agent. The customer now wishes to work with that agent again since she knows the history of the customer's issue. Unfortunately, the customer does not know the agent's name. The customer navigates to a specific URL that is associated with a contact center. The URL contains two fields: number you will be calling from and specific requests. The customer enters their phone number and their request for the female, Japanese-speaking agent which was spoken with on the previous call. The customer then uses their phone to call the contact center. The contact center network receives a call and the associated Caller-ID via its PSTN gateway, maps the inbound Caller-ID to the information provided by the customer via the Internet, parses the request that had been entered by the customer, and then routes the call and the customers supplementary information appropriately.

In accordance with another exemplary embodiment, one implementation would allow text-based call logs to store the subject along with the Caller-ID and time-of-call information. In contact centers, the data entered into the specific request field could be additional information for advocate-based routing. In yet another exemplary embodiment, if called parties activate call-forwarding to another within-enterprise extension, the subject information could appear at the entered extension as well. In an embodiment where a call that enters an enterprise network must leave the network again in order to reach the called party, the subject entered by the caller could be sent from the enterprise network as, for example, an IM or SMS message to the forwarded destination, thereby avoiding conflict with the FCC rules.

As discussed, current Caller-ID techniques utilize the PSTN to provide "subject" information as an identifiable field associated with a phone call. Because FCC rules prohibit using the PSTN to send anything other than Caller-ID to the called party prior to the called party going off-hook, this necessarily means that the called party, or a proxy acting on behalf of the called party, must answer the call in order to obtain this information. In accordance with one exemplary embodiment, the Internet is utilized as a "back door" through which information can be provided in a manner that does not violate FCC regulations.

In accordance with other exemplary embodiment, within-enterprise call server capabilities are leveraged to allow for the display of information entered by the caller to be shown on the called party's communication device; this call server can be considered a point-of-convergence for the inbound PST and provided information and the inbound internet-provided information, such that a standard display-equipped telephone (analog, digital, or IP) can present the full set of information to a called party without requiring the called party to have an endpoint that is enabled for IM, email, or the like.

Another exemplary aspect of the invention allows the message from the caller to be sent via one or more of IM, text message, email or the like. Moreover, the calling party can set up the Caller-ID information prior to actually making the call via the PSTN.

In accordance with another exemplary embodiment, a callee can inform at least one of the PSTN or the internet domain network interface to provide the message to the callee in real-time via an internet protocol. In addition, on exemplary embodiment allows automated population of the "subject line" that will be provided to the callee. This automatic population can include one or more pre-configured text, presence information, GPS information, or in general, any information obtainable by the caller or caller's endpoint.

Moreover, an appropriate interface can be provided to the caller with the activation of this interface triggered by electing to place a phone call. For example, this interface can "pop up" when a caller goes off-hook to dial an outbound call, with the interface including various fields into which the caller can provide information that will be displayed to the called party.

Accordingly, aspects of this invention are directed towards enhanced communications.

More specifically, aspects of this invention are directed toward providing enhanced Caller-ID information.

Even further aspects of the invention are directed towards synchronizing a PSTN call with information received via another communications medium.

Even further aspects of the invention are directed towards synchronizing a PSTN call with information received via an internet connection.

Additional aspects of the invention are directed toward providing Caller-ID information received via the internet in conjunction with a received PSTN telephone call.

Even further aspects of the invention are directed toward using Caller-ID entered information to assist with call routing.

Additional aspects of the invention are directed toward automatically providing a user interface while an entry of subject information to be displayed to a called party.

Further aspects of the invention are directed toward providing supplementary Caller-ID information via one or more of SMS, instant messaging, text messaging, or the like.

Even further aspects of the invention are directed toward analyzing the caller-provided information in an enterprise provided environment or call-center type environment to assist with advocate-based routing, call center queue placement, and the like. Further aspects of the invention related to providing an interface on a phone, such as a cell phone that allows entry of the subject information. This subject information could then be forwarded via one or more of a non-PSTN communications channel, SMS, IM, internet or other modality to the called party as discussed herein.

Additional aspects of this invention relate to providing the disclosed capabilities as a telco-provided service.

Additional aspects of this invention relate to buffering the information entered by the caller such that the entered information arrives contemporaneously with the received PSTN communication.

Even further aspects of the invention relate to intelligent routing based on a correlation of Caller-ID and entered call number information.

Still further aspects of the invention relate to process for correlating the caller-entered information through the PSTN communication via one or more Caller-ID numbers, Caller-ID name and information from the caller.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide enhanced communications. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
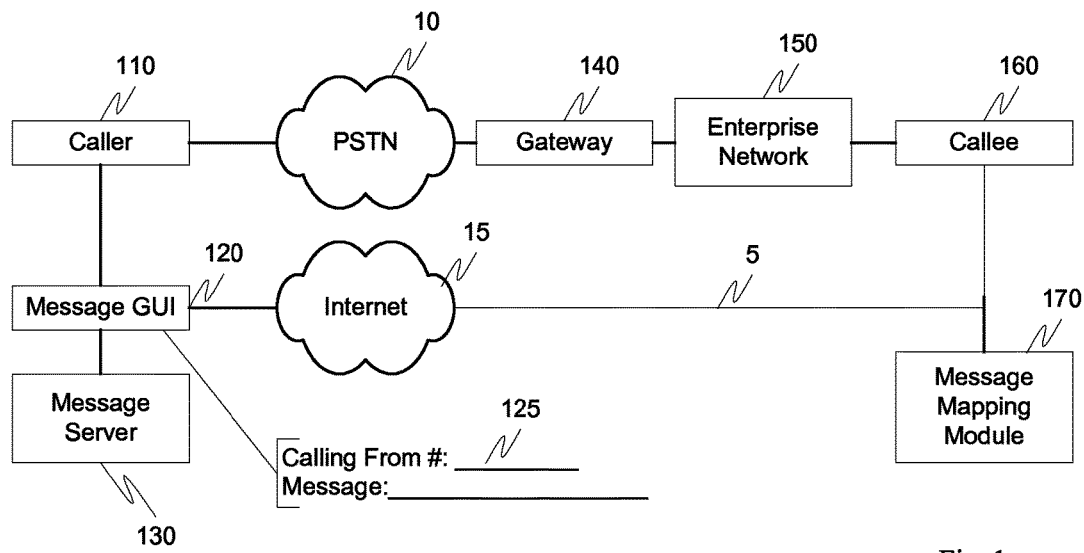
FIG. 1 illustrates an exemplary communications architecture according to this invention.

FIG. 1 illustrates an exemplary communications environment according to this invention. The communications environment 100, in addition to well-known components, includes caller 110, message GUI 120, message server 130, gateway 140, enterprise network 150, callee 160, message mapping module 170, PSTN 10, and Internet network 15 and links 5.

In operation, the caller 110 accesses a user interface provided by the message GUI 120. The message GUI 120 can provide an interface that provides, for example, a field 125 to enter the calling from number as well as the message. The entered information is stored on the message server 130 for forwarding to the callee 160.

Next, the caller 110 places a call via the PSTN network 10 that is routed through gateway 140, and enterprise network 150, to the callee 160. The message mapping module 170 associates the call arriving via the PSTN and the message sent via the Internet 15 by the message server 130. This mapping can be performed, for example, by the message mapping module 170 comparing the PSTN-based caller ID information to that entered by the caller in flied 125. The information entered by the caller 110 and to the message GUI 120 is then displayed to the callee 140, such as on a display at the callee's endpoint.

The message mapping module 170 can be operated in a plurality of different ways. For example, and in accordance with a first exemplary embodiment, the entered calling from number can be associated with the inbound PSTN call by the message mapping module 170 receiving the caller-ID information provided by the telco servicing the PSTN. In another exemplary embodiment, the message mapping module 170 could perform a lookup of the caller-ID information entered by the caller and determine a name associated with that caller-ID. This, in a similar manner, could be mapped to a name provided by the telco-provided caller-ID information.

In accordance with another exemplary embodiment, the calling from number could be automatically populated by the message server 130 into the message GUI 120 on behalf of the caller 110. As another example, the message mapping module 170 could include intelligence that allows for the mapping to occur even if there is not a one-to-one correlation between the information entered by the caller, and the information provided by the PSTN. For example, assume a caller 110 is calling from a company that pools all outbound calls on one or more trunks. The caller-ID information associated with these trunks is a "main" telephone number and, for example, the name of the company. Therefore, if the caller 110 enters their direct dial extension, a one-to-one mapping may not be directly possible. However, the message mapping module 170 could be provided with, for example, contact information, such as an address book, that includes such things as name, telephone number, work address, home address, employer information, and the like, of all the individuals the callee 160 normally communicates with. Therefore, when a call arrives via the PSTN for caller 160, and the caller information ID provided by the PSTN is a company name associated with the outbound trunk on which the call was routed, the message mapping module 170 could compare that company name to individuals stored in an address-book and determine who that caller may be. For example, a first tier of analysis could compare company names, a second tier of analysis could compare area codes, a third tier of analysis could compare the first, three-digit portion of the local number, and the like until the message mapping module 170 has a predetermined degree of confidence that it can map the information entered by the caller to an inbound PSTN call. In addition to this type of information, timing information can also be used to assist with this mapping. For example, a time stamp can be associated with the information the caller 110 enters into the message server 130. This time stamp can be forwarded to the message mapping module 170 to assist with correlating the inbound PSTN call to the caller-entered information.

Figure 2:
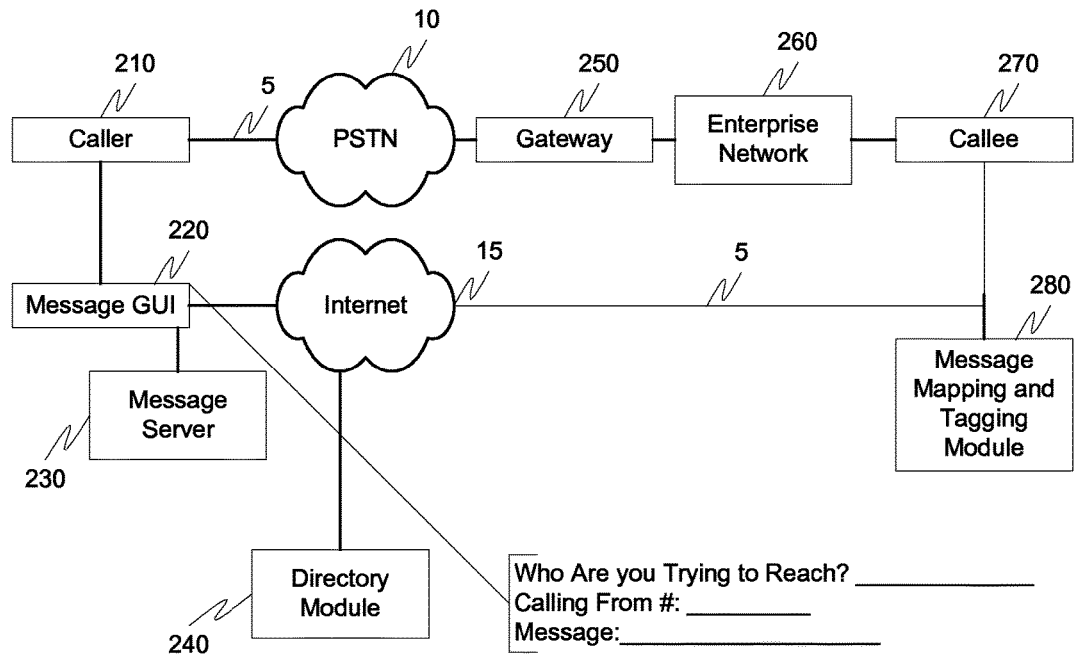
FIG. 2 illustrates a second exemplary communications architecture according to this invention.

FIG. 2 illustrates the second exemplary communications environment 200. In addition to well known componentry, the communications environment 200 includes caller 210, message GUI 220, message server 240, directory module 230, gateway 250, enterprise network 260, callee 270 and message mapping and tagging module 280. The communications environment 200 also includes the PSTN 10, Internet network 15 and links 5.

In operation, the caller 210 may know whom they are trying to reach, but they may not know their phone number. In accordance with this exemplary embodiment, the message GUI 220, cooperating with the directory module 230, could provide to the caller 210 an interface that allows for the entry of the name of the individual they are trying to reach or company, the calling from number, as well as their message. Upon receipt of this information, the message GUI 220, in cooperation with the directory module 230, could provide a looked-up telephone number to the caller 210. This telephone number could be provided one or more of visually to the caller 210 on a display and provided automatically such that the caller could click on the number, to initiate the call to the callee 270 via the PSTN 10. The gateway 250 and enterprise network 260 receive the call from the caller 210 and the associated caller-ID via its PSTN gateway, and, with the cooperation of the message mapping and tagging module 280, maps the inbound caller-ID to the information provided by the caller 210 via the message GUI 220. Message mapping and tagging module 280 does a database look-up to find the callees phone number, and then causes the display on the callees phone to show the caller's caller-ID and the subject of the call. In the event, for example, that the callee 270 opts not to answer the inbound call from the caller 210, a voicemail left by the caller 210 can be tagged, with the cooperation of the message mapping and tagging module 280, such that the information entered by the caller 210 into the message GUI 220 is stored with the voicemail. Then, upon retrieval of this voicemail, the information entered by the caller 210 into the message GUI 220 can be shown to the callee 270. Optionally, the subject information could be played to the callee with the assistance of a text-to-speech converter (not shown).

Figure 3:
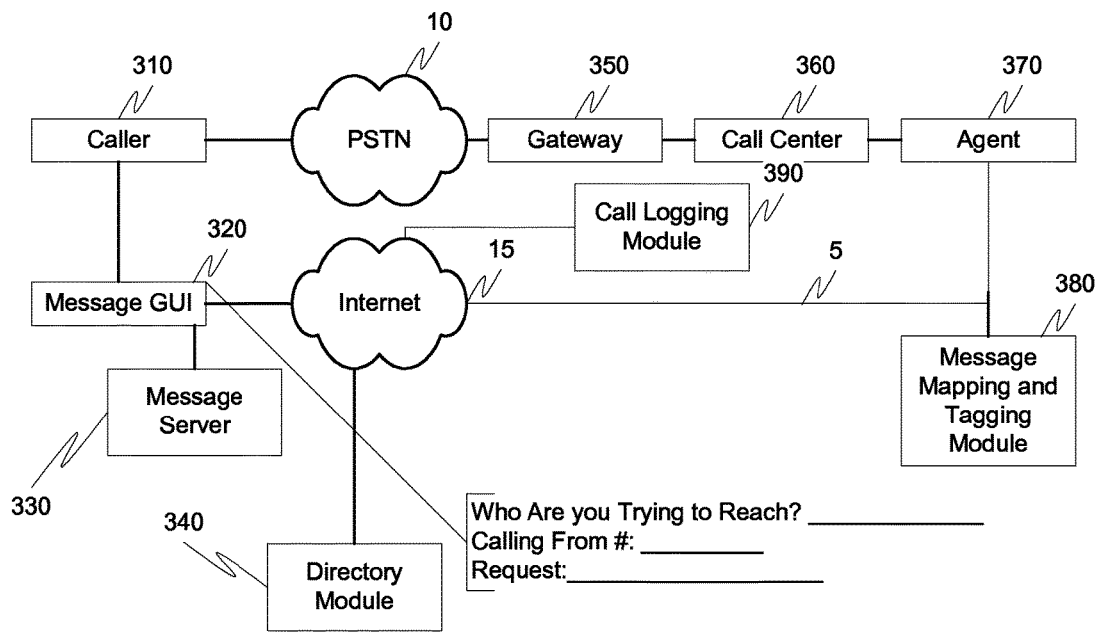
FIG. 3 illustrates a third exemplary communications architecture according to this invention.

FIG. 3 illustrates an exemplary communications environment 300. The communications environment 300 includes similar components to those described above, in addition to a call center 360 and a call logging module 390.

In operation, the caller 310 can navigate to a directory provided by the directory module 330, such as through the entry of the URL. The directory module 330 cooperating with the message GUI 320 provides the caller 310 with one or more populatable fields. These populatable fields could be populated with information such as "who are you trying to reach" "what is your calling from number" and "what is your request," "what is your account number," or the like. This information can be entered by the caller 310 via the message GUI 320 with the caller 310 then placing the call via the PSTN 10 and gateway 330 to the call center 360. The call center 360 receives the call via the PSTN and the associated caller-ID via its PSTN gateway 330, with the message mapping and tagging module 380 mapping the inbound caller-ID to the information provided by the caller 310 into the message GUI 320. The message mapping and tagging module 380 parses the request that had been entered by the caller 310 and then routes the PSTN call and the message entered via the GUI 320 to, for example, an appropriate agent 370.

In addition, the call logging module 390 can be used to log the supplemental information entered by the caller 310 as well as, with the cooperation of the message mapping and tagging module 380, information such as where the call was routed, at what time, duration of the call, and in general any information associated with the communication.

Figure 4:
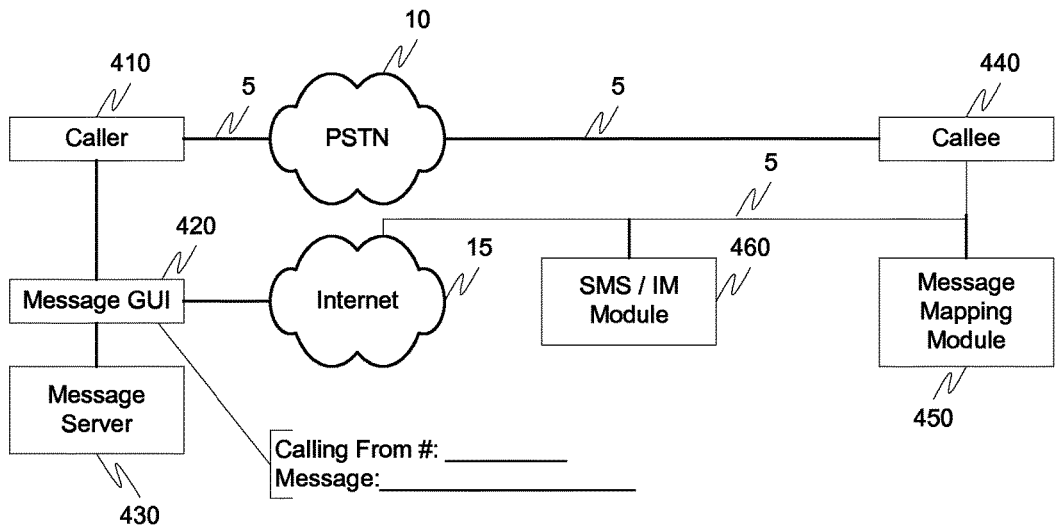
FIG. 4 illustrates a fourth exemplary communications architecture according to this invention.

FIG. 4 outlines an exemplary communications environment 400 that in addition to similar componentry described above, also includes an SMS/IM module 460. Similar to the above environments, the caller 410 enters information via the message GUI 420 that, with the cooperation of the message server 430, is forwarded via the Internet 15 to a message mapping module 450 contemporaneously with a call from the caller 410 via the PSTN 10 to the callee 440. In accordance with this exemplary embodiment, the supplemental information entered by the caller 410 can be forwarded via one or more of SMS or IM, with the cooperation of the SMS/IM module 460, to the callee 440. Then, in cooperation with the message mapping module 450, this information could be displayed in conjunction with the receipt of the received PSTN call.

Figure 5:
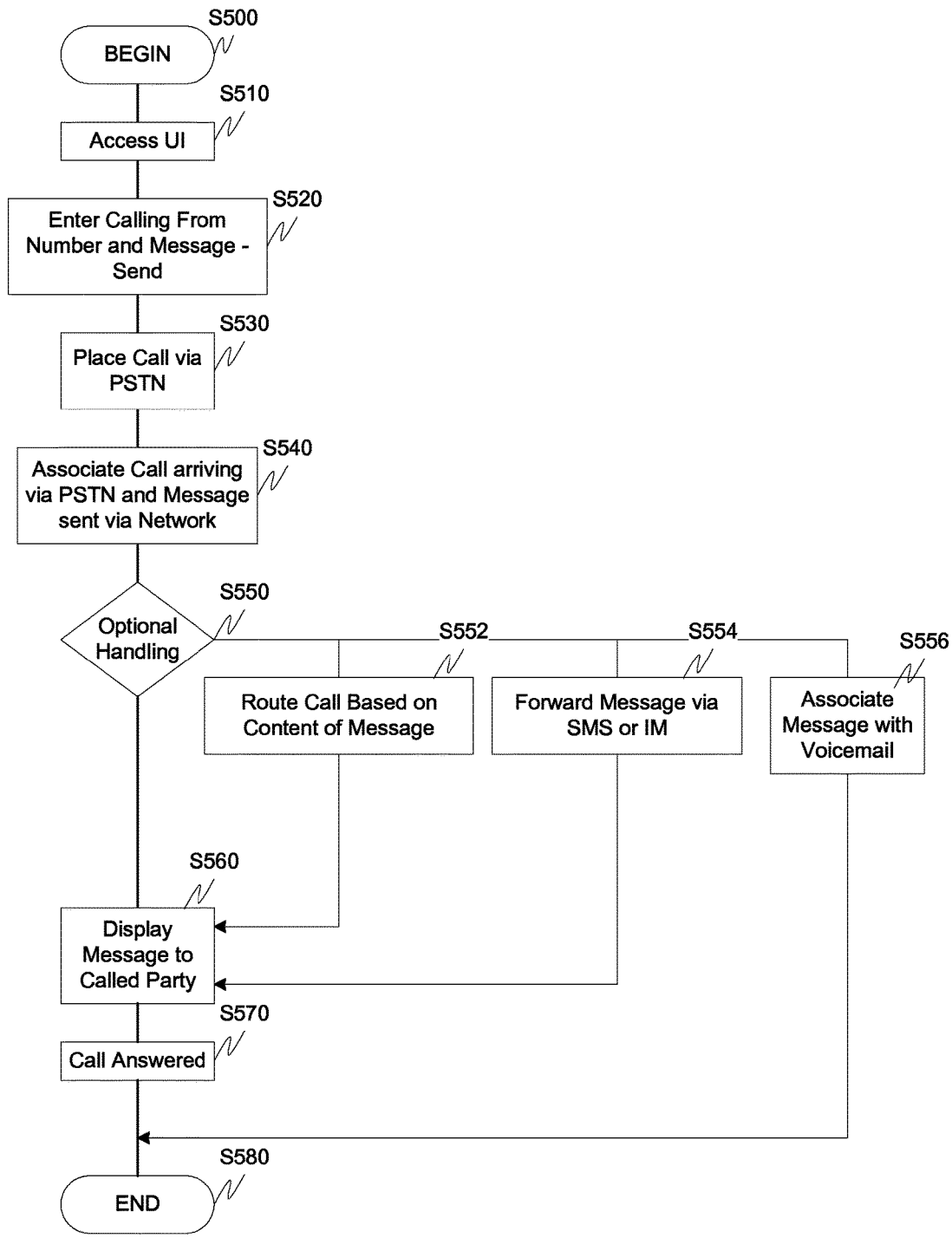
FIG. 5 is a flowchart outlining an exemplary method of providing caller-based information to a callee according to this invention.

FIG. 5 illustrates an exemplary methodology for forwarding caller-provided information to a callee according to this invention. In particular, control begins in step S500 and continues to step S510. In step S510, the caller can access a user interface. Next, in step S520, either manually or automatically the user interface is provided with the number the caller is calling from, as well as the message for the callee. Then, in step S530, the caller places a call via the PSTN to the callee. Control then continues to step S540.

In step S540, the call arriving via the PSTN is associated with the message sent via the network. Next, in step S550, a determination is made as to whether any optional handling should be performed. Examples of this optional handling includes, for example, routing the call to a particular callee based on the content of the message as illustrated in step S552, forwarding the message entered by the caller via one or more of SMS or IM as illustrated in step S554, and associating the information entered by the caller with a voicemail left by the caller for the callee as illustrated in step S556.

In step S560, the message entered by the caller is displayed, and/or optionally played, to the callee. Next, in step S570, the call is answered, with control continuing to step S580 where the control sequence ends.

Figure 6:
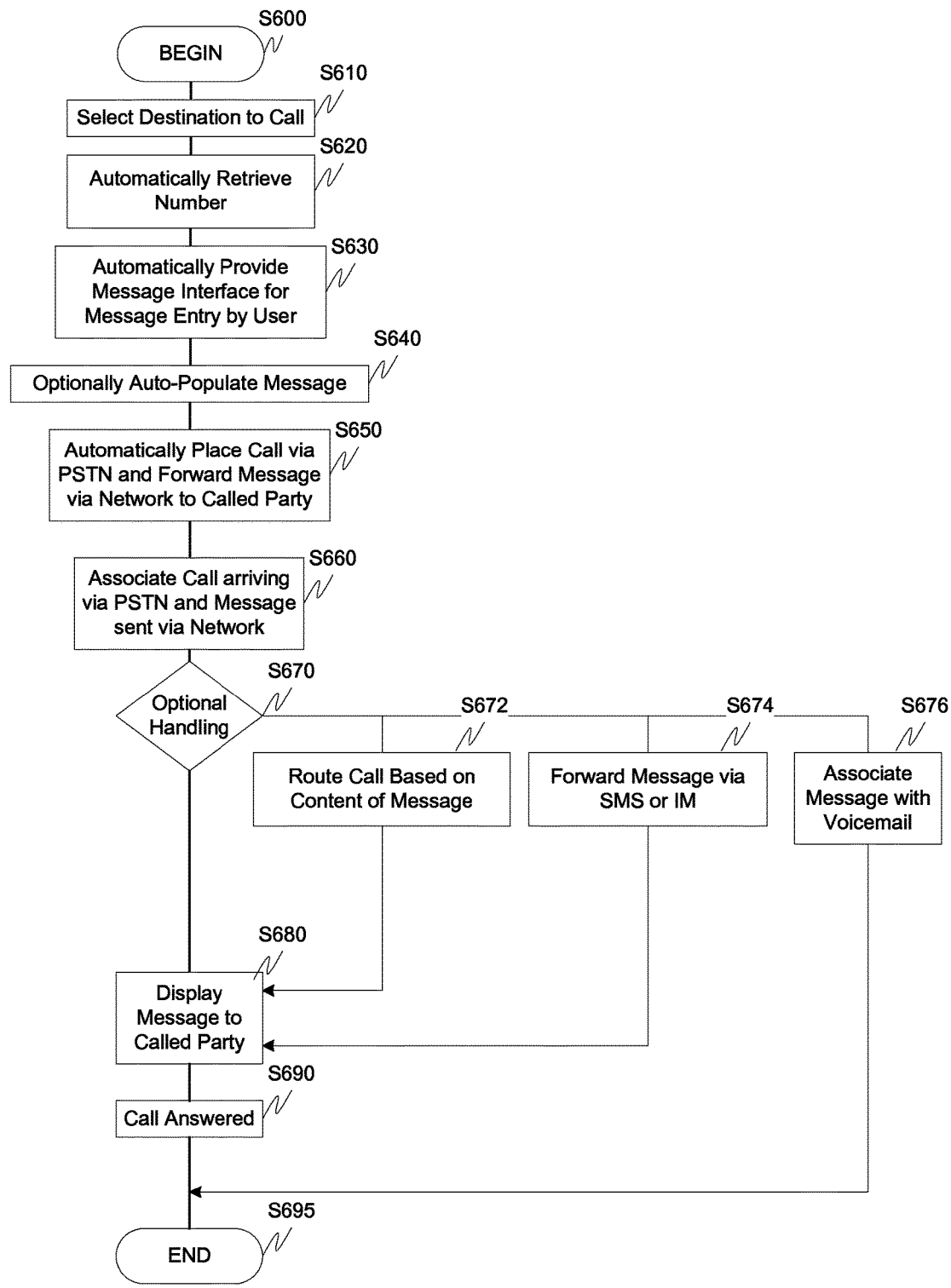
FIG. 6 is a flowchart illustrating an exemplary automated method of providing caller information into a callee according to this invention.

FIG. 6 illustrates an exemplary automated or semi-automated methodology for providing information associated with a caller to a callee, via a communications channel other than the PSTN. In particular, control begins in step S600 and continues to step S610. In step S610, a destination is selected for the call. Then, in step S620, a number associated with that destination can optionally be automatically retrieved. Control then continues to step S630.

In step S630, a message interface can automatically be provided that allows message entry by the user. For example, upon a phone going off-hook, the UI could automatically be displayed to a caller to allow for entry of information, such as a calling from number, and message. Next, in step S640, a message could optionally automatically be populated. For example, as discussed above, information that could be auto-populated could include one or more of caller-ID associated with the callers endpoint, GPS information, presence information, predetermined information entered by a caller, e.g., name, nickname, etc, or in general any information available to the callers endpoint. Then, in step S650, the call is placed via the PSTN and the message forwarded via a network to the called party. In this exemplary embodiment, the initiating of the call via the PSTN is automatically triggered upon the completion of the entry of the information for the message. Control then continues to step S660.

In step S660, a determination is made whether one or more optional handling are required. Examples of this optional handling includes, for example, routing the call to a particular callee based on the content of the message as illustrated in step S672, forwarding the message entered by the caller via one or more of SMS or IM as illustrated in step S674, and associating the information entered by the caller with a voicemail left by the caller for the callee as illustrated in step S676.

In step S680, the message entered by the caller is displayed to the callee. Next, in step S690, the call is answered, with control continuing to step S695 where the control sequence ends.

A number of variations and modifications of the invention can be used. It would be possible to provide or claims for some features of the invention without providing or claiming others.

For example, another exemplary embodiment also works with CIDCW. (Caller ID on Call Waiting displays the number and optionally the name of an incoming caller when the user is already on the phone). Just as the above-described embodiments are capable of replacing the name with a subject for CID, these embodiments can be extended to work the same way with CIDCW. For example, Paul is on a long conference call and Paul's wife calls to say that she won't be able to pick up their son from school. She thus can use the techniques disclosed herein to send a message "Can't pick up Bobbie." This way, Paul even though he is on a long conference call, is capable of getting the message in a timely manner without having to answer his wife's call.

The exemplary systems and methods of this invention have been described in relation to enhancing communications. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as links 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for enhanced communication comprising:
receiving information, by a processor, via a distributed network, from a communications endpoint, the received information having been entered, by a caller, on an interface on the communications endpoint, wherein the received information comprises an entered callee's name corresponding to a callee;
receiving an inbound call, by the processor, via a Public Switched Telephone Network (PSTN), from the communications endpoint, wherein the inbound call is initiated based on the entered callee's name;
in response to receiving the entered callee's name via the distributed network and receiving the inbound call via the PSTN, looking-up the entered callee's name, by the processor, in a database to find a telephone number for the callee; and
routing, by the processor, the inbound call from the caller to the callee based on the looked-up telephone number for the callee.

2. The method of claim 1, wherein the received information further comprises timing information to identify the inbound call, wherein the timing information to identify the inbound call is used to map the received information for routing the inbound call from the caller to the callee.

3. The method of claim 2, wherein the timing information is a time stamp that is used to identify the inbound call.

4. The method of claim 1, wherein the distributed network is an internet and wherein the received information further comprises one or more of a name, a calling from number, a pre-configured text, presence information, Global Positioning Satellite (GPS) information, a nickname, subject information, or a message.

5. The method of claim 4, wherein the received information comprises the calling from number.

6. The method of claim 4, wherein the received information comprises the presence information.

7. The method of claim 4, wherein the received information comprises the GPS information.

8. The method of claim 4, wherein the received information comprises the nickname.

9. The method of claim 4, wherein the received information comprises the subject information.

10. The method of claim 1, wherein the received information is one or more of a name, a calling from number, a pre-configured text, presence information, Global Positioning Satellite (GPS) information, a nickname, subject information, or a message, wherein the received information is one or more of displayed to or played to the callee, and further comprising one or more of forwarding the received information to another destination or displaying the received information on a Caller-ID Call Waiting display.

11. The method of claim 1, wherein the looking-up is based on one or more of caller-ID information, the received information, or plain old telephone system information and wherein the looking-up is used to route the inbound call to a customer service agent in a call center.

12. The method of claim 1, wherein the received information is stored with a left voice mail message and wherein the left message is from the caller.

13. The method of claim 1, wherein the routed call from the caller to the callee is further routed based on a caller-ID supplied as part of the inbound call, wherein the received information further comprises a user name that is routed over the distributed network, and wherein the user name routed over the distributed network is used in conjunction with a called-ID supplied in the inbound call to identify a user in a corporation.

14. A system for enhanced communication comprising:
a microprocessor executable message mapping module and processor that receives information, via a distributed network, from a communications endpoint, the received information having been entered on an interface, by a caller, on the communications endpoint, wherein the received information comprises an entered callee's name of a callee, the processor receives an inbound call, via a Public Switched Telephone Network (PSTN), from the communications endpoint, wherein the inbound call is initiated based on the entered callee's name, looks-up the entered callee's name, by the processor, in a database to find a telephone number for the callee in response to receiving the entered callee's name via the distributed network and receiving the inbound call via the PSTN, and the processor routes the inbound call from the caller to the callee based on the looked-up telephone number for the callee.

15. The system of claim 14, wherein the received information further comprises timing information to identify the inbound call, wherein the timing information to identify the inbound call is used to map the received information for routing the inbound call from the caller to the callee.

16. The system of claim 15, wherein the timing information is a time stamp that is used to identify the inbound call.

17. The system of claim 14, wherein the distributed network is an internet and wherein the received information further comprises one or more of a name, a calling from number, a pre-configured text, presence information, GPS information, a nickname, subject information, or a message.

18. The system of claim 14, wherein the received information is one or more of a name, a calling from number, a pre-configured text, presence information, GPS information, a nickname, subject information, or a message, wherein the received information is one or more of displayed to or played to the callee, and wherein an enterprise network that cooperates with the message mapping module to one or more of forward the received information to another destination or display the received information on a Caller-ID Call Waiting display.

19. The system of claim 14, wherein the looking-up is based on one or more of caller-ID information, the received information, or plain old telephone system information and wherein the look up is used to route the inbound call to a customer service agent in a call center.

20. The system of claim 14, wherein the received information is stored with a left voice mail message and wherein the left message is from the caller.

* * * * *